United States Patent [19]

Ogata et al.

[11] 4,246,240

[45] Jan. 20, 1981

[54] PROCESS FOR SEPARATING COBALT AND NICKEL FROM A SOLUTION CONTAINING COBALT AND NICKEL

[75] Inventors: Takashi Ogata; Shoichiro Namihisa; Tsumoru Fujii, all of Hitachi, Japan

[73] Assignee: Nippon Mining Co., Ltd., Tokyo, Japan

[21] Appl. No.: 52,736

[22] Filed: Jun. 28, 1979

[30] Foreign Application Priority Data

Jul. 24, 1978 [JP] Japan ................................. 53-90263
Nov. 9, 1978 [JP] Japan ............................... 53-138114

[51] Int. Cl.² .............................................. C01G 51/00
[52] U.S. Cl. .................................................... 423/139
[58] Field of Search ...................... 423/139, DIG. 14

[56] References Cited

U.S. PATENT DOCUMENTS

| | | | |
|---|---|---|---|
| 3,399,055 | 8/1968 | Ritcey | 423/139 |
| 3,402,042 | 9/1968 | Lichty | 423/139 |
| 3,966,569 | 6/1976 | Reinhardt | 423/139 |
| 4,088,733 | 5/1978 | De Schepper | 423/139 |

FOREIGN PATENT DOCUMENTS 2417510 10/1975 Fed. Rep. of Germany .
2820841 11/1978 Fed. Rep. of Germany ........... 423/139

OTHER PUBLICATIONS

*Chemical Abstracts,* vol. 91, Nos. 77,365J and 24,689M, (1979).

*Primary Examiner*—Brian E. Hearn
*Attorney, Agent, or Firm*—Stevens, Davis, Miller & Mosher

[57] ABSTRACT

An acid solution containing cobalt and nickel is contacted with an organic extraction medium comprising alkyl phosphonic acid mono alkyl ester where said alkyl group has 8-10 carbon atoms in two or more stages, wherein the contact at a first stage is carried out at a pH value not exceeding 5.0 and at a second and further stages being carried out at a pH range of 5.5-7.0. Thereby cobalt may effectively and selectively be extracted into the organic extraction medium from the solution without excess rise in viscosity. Cobalt and nickel may be separately recovered with high purity.

6 Claims, 2 Drawing Figures

PROCESS FOR SEPARATING COBALT AND NICKEL FROM A SOLUTION CONTAINING COBALT AND NICKEL

BACKGROUND

The present invention relates to a process for separating cobalt and nickel from a solution containing cobalt and nickel by liquid-liquid extraction using a specific organic phosphorus compound.

Generally, serious drawbacks are observed in a conventional liquid-liquid extraction process wherein cobalt is selectively extracted into an organic phase containing an extractant in that the viscosity of the organic phase will rise up to more than 150 cSt hindering mixing of an extraction system and pumping, since a solution containing cobalt and nickel to be treated ("raw solution" hereinafter) has a relatively high cobalt concentration, thus an extracted cobalt being largely accumulated in the organic phase at an initial extraction stage, i.e. at the initial contact stage of the raw solution with the organic extraction medium. In such an industrial extraction process, there is usually dissolved iron in the extraction system, whereby the viscosity of the organic extraction medium will rise still higher. Such drawbacks prevent one from applying an extractant even capable of pronounced selective extraction of cobalt.

OBJECT OF THE PRESENT INVENTION

An object of the present invention is to provide a novel process for separating cobalt and nickel from a solution containing cobalt and nickel.

Another object of the present invention is to provide a novel process for separating cobalt and nickel which eliminates the drawbacks in the prior art.

Another object of the present invention is to provide a process wherein the organic extraction medium may be kept at a low viscosity during a cobalt extraction.

A further object of the present invention is to provide a process wherein cobalt and nickel may be separated with a high purity at the same time, respectively.

SUMMARY OF THE INVENTION

The present invention is based upon a finding that the viscosity rise of an organic phase may be eliminated by controlling the pH value of the extraction system at a low value at an initial stage of a cobalt extraction process.

The present invention is further based on a finding that an alkyl phosphonic acid monoalkyl ester represented by a formula

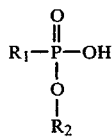

where $R_1$ and $R_2$ denote alkyl group having 8 to 10 carbon atoms ($C_8$ to $C_{10}$) may be used without unfavourable viscosity increase of the organic phase providing a favourable cobalt extraction.

The present invention provides a process for separating cobalt and nickel from a solution containing cobalt and nickel by selective liquid-liquid extraction of cobalt into an organic phase, an acid solution containing cobalt and nickel being contacted with an organic extraction medium containing an extractant, wherein the improvement comprises:

said acid solution being contacted with
the organic extraction medium in two or more stages,
a first contact stage being controlled to a pH value of not exceeding 5,
a second contact stage and further contact stages being controlled to a pH value from 5.5 to 7.0, and
alkyl phosphonic acid monoalkyl ester represented by a formula

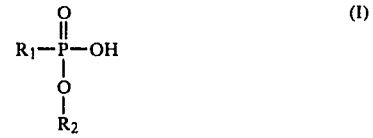

where $R_1$ and $R_2$ denote alkyl group having 8 to 10 carbon atoms and $R_1$ may be the same as or different to $R_2$ being used as the extractant.

DETAILED DESCRIPTION

In the present invention, the raw solution which is an object of treatment comprises an acid solution containing cobalt and nickel as a typical one which is obtained by leaching a cobalt and nickel-containing ore with acid, preferably sulphuric acid. That raw solution usually contains iron, copper and so on besides the above metals. Such impurities are removed from the raw solution by precipitation, filtration etc. prior to a treatment according to the present invention. Then the raw solution from which the impurities have been removed is subjected to a contact in two or more stages with an organic extraction medium comprising an extractant. As the extractant, alkyl phosphonic acid monoalkyl ester represented by said formula (I) is used. As the alkyl group $R_1$ and $R_2$ in the formula (I) may be used one or two alkyl groups selected from following alkyl groups:

(as $C_8$),2-ethyl-1-hexyl, 4-methyl-1-heptyl, 1-octyl, 3-ethyl-2-methyl-3-pentyl, and the like;
(as $C_9$),3,5,5-trimethyl-3-hexyl, 3-ethyl-5-methyl-3-hexyl, 1-nonyl, 2-methyl-2-octyl, and the like;
(as $C_{10}$),isodecyl, 1-decyl, 4-propyl-4-heptyl, 5-methyl-2-isopropyl-1-hexyl, 3,7-dimethyl-1-octyl, 3-ethyl-3-octyl and the like.

Thus said extractant comprises for instance:
2-ethyl-1-hexyl phosphonic acid mono-2-ethyl-1-hexyl ester, 3,5,5-trimethyl-3-hexyl phosphonic acid mono-3,5,5-trimethyl-3-hexyl ester, isodecyl phosphonic acid monoisodecyl ester, 2-ethyl-1-hexyl phosphonic acid mono-3,5,5-trimethyl-3-hexyl ester, 2-ethyl-1-hexyl phosphonic acid monoisodecyl ester, 3,5,5- trimethyl-3-hexyl phosphonic acid mono isodecyl ester, and the like.

A mixture thereof may be used as well. It has not been known that those compounds as listed above have a specific selectively cobalt-extracting feature though these are known compounds.

According to the present invention the contact of the raw solution with the organic extraction medium is carried out in two or more stages, and the first stage extraction ($EX_1$), i.e. the initial stage extraction is controlled to a pH value of not exceeding 5 and not less than about 3.0, preferably a pH range between 3.5–5.0.

Some manners of adding T.B.P., higher alcohol etc. might be proposed for a mere purpose to depress the organic phase viscosity in the initial stage where the viscosity tends to increase. However, such manners turned out unpractical because they accompany a depression in the extraction efficiency even though a viscosity fall might be achieved. Thus, the present invention provides a process wherein no such viscosity-depressing additive is used.

Figure 1:
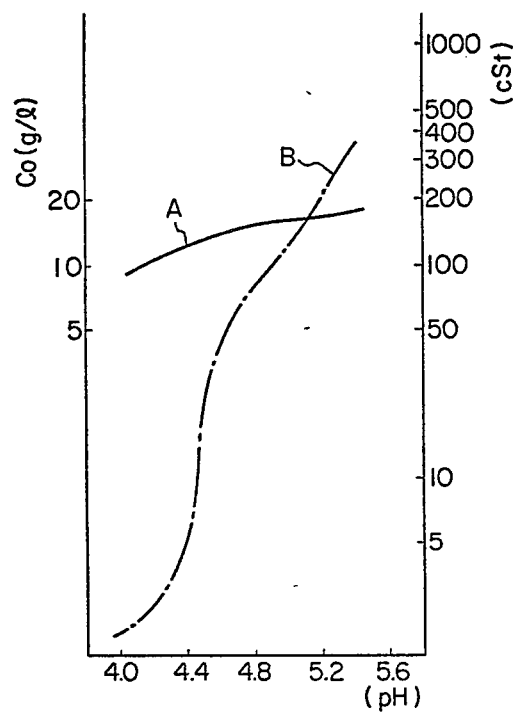
FIG. 1 graphically shows a relation of the pH value to the organic phase kinematic viscosity in the first extraction stage when 2-ethyl-1-hexyl phosphonic acid mono-2-ethyl-1-hexyl ester is used as the extractant; left and right ordinate showing cobalt content in the organic phase and corresponding kinematic viscosity thereof, respectively, and abscissa showing the pH value of the solution. Each curve A and B represents cobalt amounts in the organic phase and kinematic viscosities thereof, respectively.

Due to the pH control at the first stage, the extraction of cobalt from the raw solution into the organic phase is restrained or suppressed, thus eliminating a rapid rise of the organic phase viscosity due to a rise of cobalt concentration in the organic phase which viscosity would otherwise rise. Thus the mixing operation in the extraction process and the pumping of fluid can be done without difficulties. FIG. 1 graphically shows a relation of pH value to the organic phase kinematic viscosity when 2-ethyl-1-hexyl phosphonic acid mono-2-ethyl-1-hexyl ester is used as the extractant. Here is used said extractant diluted with kerosene to an extractant concentration of 20% by volume as the organic extraction medium and a varying relation of the pH value, cobalt content in the organic phase and kinematic viscosity at a temperature of 60° C. is shown. The kinematic viscosity of the organic phase does not exceed 150 centi Stokes at a pH value of not exceeding 5.0, and the extractable cobalt concentration in the organic phase is nevertheless not much depressed. As a diluent for the extractant, mineral oils such as kerosene and the like, and other known water-insoluble diluent or solvent or a mixture thereof, preferably kerosene or a mixture thereof may be used.

Accordingly the contact between the raw solution and the organic extraction medium is made in two or more stages in the present invention, and the contact therebetween is preferably made in counter current flow. Other known manners of liquid-liquid contact may be used. A temperature between 30° and 70° C., preferably around 60° C., may be applied to the contact stages. A volumetric contact ratio of the raw solution to the organic extraction medium may range from 10:1 to 1:10, preferably be around 1:1.

After the first stage extraction has been completed, a further extraction in a second stage or later stages is carried out within a conventional pH range, e.g. from 5.5 to 7, which pH range may be controlled by adding sodium hydroxide, aqueous ammonia or the like.

Figure 2:
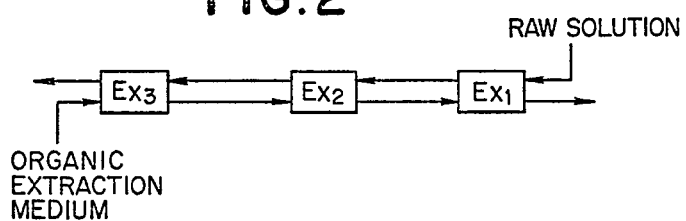
FIG. 2 shows a flow sheet for a liquid-liquid extraction embodiment of the present invention.

In the following, the present invention is described by a preferred embodiment for a better illustration and not limitation thereof. An embodiment of the present invention wherein the contact is made in a continuous way is illustrated by a flow sheet as shown in FIG. 2. In a liquid-liquid extraction operation as shown in FIG. 2, a cobalt and nickel-containing raw soultion is contacted with an organic extraction medium essentially consisting of said extractant as described by the formula (I) and a diluent in counter current flow. The raw soultion enters a stage $EX_1$, then a second stage $EX_2$ and further a third stage $EX_3$ in FIG. 2, while the organic extraction medium is sequentially introduced into the stage $EX_3$, then $EX_2$ and further $EX_1$. Thus the raw solution flows in counter current flow to the organic extraction medium flow contacting with the latter in each stage, whereon the organic extraction medium selectively extracts cobalt at each first-encountering stage then enters the stage $EX_1$ bearing the extracted cobalt at the passed stages. The extraction medium first introduced into the stage $EX_3$ comes to bear more and more cobalt along its flow step to $EX_2$ and $EX_1$, entering at last the stage $EX_1$, while on the other hand nickel remains in the raw solution which flows from $EX_1$ via $EX_2$ to $EX_3$.

In the process as aforementioned, the extraction medium viscosity at the stage $EX_1$ would in general tend to rise rapidly which would cause difficulties in mixing and pumping. In the present invention, therefore, the rapid rise in the viscosity at $EX_1$ is eliminated by controlling the pH value of the raw solution to a range not exceeding pH 5.0. In the other aspect, a nickel concentration in the extraction medium at an output of $EX_1$ should be kept as low as possible, for which cobalt concentration of the raw solution at a raw solution outlet of $EX_1$ should be kept as high as possible, the foregoings also requiring to maintain the pH value of $EX_1$ to a range not exceeding pH 5.0.

It is further illustrated in detail for instance by a case where the extraction medium consisting of 20% by volume of the extractant and 80% by volume of kerosene as the diluent is used. The cobalt concentration of the aqueous phase at the solution outlet of $EX_1$ cannot be maintained high enough if the pH value at $EX_1$ does exceed pH 5.0 where the cobalt concentration of the aqueous phase stands below 15 g/l. In that condition it will be difficult to recover cobalt with a high purity since said nickel concentration at the extraction medium outlet of $EX_1$ can not be decreased enough. On the other hand the organic phase viscosity will exceed 150 cSt if the pH value at $EX_1$ does exceed pH 5.0 where the cobalt concentration of the aqueous phase at an solution inlet of $EX_1$ exceeds 15 g/l, which would result in difficulties in mixing, pumping and so on.

The following should be noted:

If the pH value at $EX_1$ becomes lower than around pH 3.0, the cobalt concentration in the aqueous phase at the solution outlet of $EX_1$ becomes too high, resulting in a difficulty in a recovery of high purity nickel.

The pH value at $EX_2$ and $EX_3$ may range from 5.5 to 7.0, for instance, wherein the pH control may preferably be made by adding sodium hydroxide or aqueous amonia.

The nickel concentration in the relevant organic phase and the cobalt concentration in the relevant aqueous phase may be controlled, respectively, on the one hand by controlling the cobalt amount in the aqueous phase being transferred from $EX_1$ to $EX_2$ according to an extraction equilibrium equation in the liquid-liquid extraction process as above mentioned, on the other hand by controlling the cobalt amount in the organic phase being transferred from $EX_3$ to $EX_2$. For instance, if an aqueous phase on the way from $EX_1$ to $EX_2$ originating from a raw solution containing nickel 30 g/l and cobalt 13 g/l get a cobalt amount of not less than 0.5 g/l, then the nickel concentration of the organic phase coming out of $EX_1$ may be controlled to a value not exceeding 0.5 g/l. On the other hand if the cobalt concentration in the organic phase on the way from $EX_3$ to $EX_2$ is controlled to a value of not exceeding 0.3 g/l, then the cobalt concentration in the aqueous phase coming out of $EX_3$ may be controlled to a cobalt concentration of not exceeding 0.005 g/l.

The outcoming aqueous phase from $EX_3$ is, e.g., an aqueous solution of nickel sulphate which is delivered to a further process for recovery of nickel, wherein nickel metal with a high purity containing cobalt not exceeding 0.02% by weight may be recovered, e.g., through an electrolytic winning.

The cobalt-containing organic phase coming out of $EX_1$ contains a small amount of nickel and is delivered to a scrubbing process, being scrubbed with an aqueous solution containing cobalt in order to remove nickel. In the present invention wherein the extractant as described by the formula (I) is used, the remaining amount of nickel in the organic phase may well be scrubbed out thereof by a nickel-containing solution such as the solution as is the case in said extraction process, resultant nickel amount in the organic phase being remarkably decreased.

The organic extraction medium which is coming out of said scrubbing process is contacted with an inorganic acid solution in a stripping process, whereby cobalt in the organic extraction medium is removed, then the reclaimed extraction medium is further reused in a further extraction process. The stripped cobalt in the inorganic acid solution is further delivered to, e.g., the electrolytic refining process, thus high purity metallic cobalt with a nickel amount of not exceeding 0.01% may be obtained.

Accordingly, the present invention enables us to obtain high purity metallic cobalt and nickel from a solution containing cobalt and nickel by using the specific organic phosphor compound as the extractant and by the two or more-staged contact process. Advantages of the present invention are summarized as follows:

(1) The viscosity of the organic phase in the first extraction stage $EX_1$ may be kept at a low viscosity and the nickel amount therein may be reduced to a lowest value by using the organic phosphorus compound as represented by the formula (I) and controlling the pH value therein to a pH value not exceeding 5.0.

(2) The nickel concentration in the organic phase may be kept low enough, even when the organic phase out of the first extraction stage outlet is scrubbed with the cobalt solution containing nickel.

(3) Metallic cobalt and nickel with a high purity may be separately obtained at the same time by the two or more-staged extraction process.

According to the present invention, a rotary type extraction apparatus or machine and other known continuously operating apparatus may be applied as well. For such a continuous operation, said first extraction stage should be construed to be an initial stage or the like.

EXAMPLES

EXAMPLE 1

An aqueous solution containing 30 g/l nickel, 12 g/l cobalt and 1.8 g/l iron was mixed and contacted with an organic extraction medium comprising 20% by volume 2-ethyl-1-hexyl phosphonic acid mono-2-ethyl-1-hexyl ester as an extractant and 80% by volume kerosene as a diluent in a ratio of 1:1 in a three-staged extraction process. A liquid temperature of 60° C. was maintained in each stage, the pH value of the first stage being controlled to pH 4.5. The resultant each aqueous and organic phases sampled out of each stage had the following cobalt and nickel concentrations as shown in Table 1.

TABLE 1

| Out of (after) the stage | Aq. phase (g/l) Co | Ni | Org. phase (g/l) Co | Ni |
|---|---|---|---|---|
| 1. | 5 | 34.9 | 12 | 0.14 |
| 2. | 0.05 | 38.9 | 5.05 | 5 |
| 3. | 0.002 | 29.9 | 0.05 | 9 |

EXAMPLE 2

An aqueous solution containing 30 g/l nickel, 12 g/l cobalt and 2 mg/l iron is mixed and contacted with each organic extraction medium in a ratio of 1:1 in three stages, each extraction medium comprising 80% by volume kerosene as a diluent and each 20% by volume 3,5,5-trimethyl-3-hexyl phosphonic acid mono-3,5,5-trimethyl-3-hexyl ester, 3,5,5-trimethyl-3-hexyl phosphonic acid mono isodecyl ester of 2-ethyl-1-hexyl phosphonic acid mono isodecyl ester as an extractant, respectively. Each stage was controlled to a temperture of 65° C. and the pH value of the first stage was controlled to pH 4.5–4.6. Resultant aqueous and organic phases from each stage are shown in Table 2 with their cobalt and nickel concentration. As shown in Table 2, the nickel concentration in the organic phase out of (after) the first stage extraction and the cobalt concentration in the aqueous phase out of (after) the third stage were remarkably reduced.

The resultant viscosity values, pH values, and the cobalt concentrations of the organic phase in each stage as discosed in Examples 1 and 2 are shown in Table 3. It is understood that the viscosity of each stage may be reduced to a value not exceeding 150 cSt even at a high cobalt concentration in the organic phase.

EXAMPLE 3

(a) The organic phase obtained from the first extraction stage of Example 3 which comprises 3,5,5-trimethyl-1-hexyl phosphonic acid mono-3,5,5-trimethyl hexyl ester was scrubbed with an acid solution comprising 30 g/l nickel and 20 g/l cobalt having a pH value 4.5, which results being shown in Table 4.

(b) A variant example where the nickel concentration of the aqueous phase is 1.0 g/l after scrubbing treatment is shown in Table 4 as well. It has turned out that nickel concentration in the organic phase may be reduced to 0.002 g/l after scrubbing.

(c) A further variant example using 2-ethyl-1-hexyl phosphonic acid mono-2-ethyl-1-hexyl ester as the extractant and being operated in the same manner as above resulted in similar sata.

TABLE 2

| Extractant | 3,5,5-trimethyl-3-hexyl phosphonic acid mono-trimethyl-3-hexyl ester | | | | 3,5,5-trimethyl-3-hexyl phosphonic acid mono-isodecyl ester | | | | 2-ethyl-1-hexyl phosphonic acid mono-isodecyl ester | | | |
|---|---|---|---|---|---|---|---|---|---|---|---|---|
| Phase | aqueous | | organic | | aqueous | | organic | | aqueous | | organic | |
| Component | Co | Ni | Co | Ni | Co | Ni | Co | Ni | Co | Ni | Co | Ni |
| Out of (after) stage | | | | | | | | | | | | |
| 1 | 4.5 | 34.2 | 12 | 0.15 | 5.1 | 35 | 11.5 | 0.17 | 5.1 | 34 | 12 | 0.15 |
| 2 | 0.007 | 37.8 | 4.6 | 4.0 | 0.006 | 38 | 5.1 | 4.4 | 0.07 | 38 | 4.5 | 4.5 |
| 3 | 0.003 | 29.7 | 0.07 | 9.0 | 0.003 | 29.8 | 0.06 | 9.5 | 0.004 | 29.5 | 0.07 | 9.0 |

TABLE 3

| Stage | Measured value | 3,5,5-trimethyl-1-nexyl phosphonic acid mono-3,5,5-trimethyl-1-hexyle ester | 3,5,5-trimethyl-1-hexyl phosphonic acid monoisodecyl ester | 2-ethyl-1-hexyl phosphonic acid monoisodecyl ester | 2-ethyl-1-hexyl phosphonic acid mono-2-ethyl-1-hexyl |
|---|---|---|---|---|---|
| 1 | pH | 4.5 | 4.6 | 4.5 | 4.5 |
|   | cSt* | 45 | 60 | 50 | 40 |
|   | Co** (org.ph.) | 12 | 11.5 | 12 | 12 |
| 2 | pH | 6.0 | 6.0 | 6.0 | 6.0 |
|   | cSt* | 8 | 8 | 7 | 5 |
|   | Co** (org.ph.) | 4.6 | 5.1 | 4.5 | 5.05 |
| 3 | pH | 6.2 | 6.0 | 6.0 | 6.0 |
|   | cSt* | 3 | 3 | 3 | 2 |
|   | Co** (org.ph.) | 0.07 | 0.06 | 0.07 | 0.05 |

Note:
*kinematic viscosity at 60° C.
**cobalt concentration in the organic phase (g/l)

REFERENCE TEST

A solution comprising 30 g/l nickel and 20 g/l cobalt was treated at the first stage in the same manner as disclosed in Example 2 except that sodium di-2-ethyl hexyl phosphate was used as an extractant. A resultant organic phase therefrom was scrubbed as in above Example 3, results thereof being shown also in Table 4.

TABLE 4

| | Example 3(a) (g/l) | | Example 3(b) (g/l) | | Reference Test (g/l) | |
|---|---|---|---|---|---|---|
| | Co | Ni | Co | Ni | Co | Ni |
| org. pH. from the first stage | 12 | 0.15 | 12 | 0.15 | 11.7 | 1.0 |
| org. pH. after scrubbing | 12 | 0.015 | 12 | 0.002 | 11.7 | 0.19 |
| aq. pH. after scrubbing | 20 | 30 | 19 | 1.0 | 20 | 30.2 |

Accordingly as shown in Table 4, the nickel concentration in the organic phase after scurbbing may be remarkably reduced in the present invention in comparison to the prior art.

EXAMPLE 4

The aqueous phase containing 29.9 g/l nickel and 0.002 g/l cobalt which was obtained from the third stage of Example 1 and the organic phase (Co 12 g/l, Ni 0.002 g/l) which was obtained through scrubbing in Example 3 were stripped, thereafter the aqueous phase was electro-winned, whereby metallic nickel and cobalt being recovered. Those metals had following compositions as shown in Table 5.

TABLE 5

| | Co wt/wt % | Ni wt/wt % |
|---|---|---|
| metallic cobalt | 99.98 | 0.01 |
| metalic nickel | 0.02 | 99.97 |

We claim:
1. A process for separating cobalt and nickel from a solution containing cobalt and nickel by selective liquid-liquid extraction of cobalt into an organic phase, an acid solution containing cobalt and nickel being contacted with an organic extraction medium containing an extractant, and stripping the cobalt with an acid solution, wherein the improvement comprises:
 said acid solution being contacted with the organic extraction medium in two or more stages,
 a first contact stage being controlled to a pH value not exceeding 5,
 a second contact stage and any further contact stages being controlled to a pH value of from 5.5 to 7.0, and
 alkyl phosphonic acid monoalkyl ester represented by the formula:

$$R_1-\overset{O}{\underset{\underset{R_2}{O}}{\overset{\|}{P}}}-OH$$

wherein $R_1$ and $R_2$ denote alkyl group having 8 to 10 carbon atoms and $R_1$ may be the same as or different from $R_2$ being used as the extractant.

2. A process as defined in claim 1, wherein an alkyl phosphonic acid monoalkyl ester which comprises one or two alkyl groups for said $R_1$ and $R_2$ selected from a group consisting of:

2-ethyl-1-hexyl, 4-methyl-1-heptyl, 1-octyl, 3-ethyl-2-methyl-3-pentyl 3,5,5-trimethyl-3-hexyl, 3-ethyl-5-methyl-3-hexyl, 1-nonyl, 2-methyl-2-octyl, isodecyl, 1-decyl, 4-propyl-4-heptyl, 5-methyl-2-isopropyl-1-hexyl, 3,7-dimethyl-1-octyl and 3-ethyl-3-octyl group.

or a mixture thereof is used as said extractant.

3. A process as defined in claim 1, wherein an alkyl phosphonic acid monoalkyl ester which comprises one or two alkyl groups for said $R_1$ and $R_2$ selected from a group consisting of 2-ethyl-1-hexyl, 3,5,5-trimethyl-3-hexyl and isodecyl group or a mixture thereof is used as said extractant.

4. A process as defined in claim 1, wherein said acid solution is contacted with the organic extraction medium in a counter current flow contact in two or more stages.

5. A process as defined in claim 1, wherein said acid solution is a sulfuric acid solution.

6. A process as defined in claim 1, wherein said first contact stage is controlled to a pH value from 3.0 to 5.0.

* * * * *

REEXAMINATION CERTIFICATE (7th)

United States Patent [19]

Ogata et al.

[11] B1 4,246,240

[45] Certificate Issued Jun. 1, 1982

[54] PROCESS FOR SEPARATING COBALT AND NICKEL FROM A SOLUTION CONTAINING COBALT AND NICKEL

[75] Inventors: Takashi Ogata; Shoichiro Namihisa; Tsumoru Fujii, all of Hitachi, Japan

[73] Assignee: Nippon Mining Co., Ltd., Tokyo, Japan

Reexamination Request
No. 90/000,071, Sep. 17, 1981

Reexamination Certificate for:
Patent No.: 4,246,240
Issued: Jan. 20, 1981
Appl. No.: 52,736
Filed: Jun. 28, 1979

[30] Foreign Application Priority Data
Jul. 24, 1978 [JP] Japan .................. 53-90263
Nov. 9, 1978 [JP] Japan .................. 53-138114

[51] Int. Cl.³ .......................................... C01G 51/00
[52] U.S. Cl. .................................................. 423/139
[58] Field of Search .................. 423/139; 75/101BE

[56] References Cited

U.S. PATENT DOCUMENTS
4,196,076  4/1980  Fujimoto et al. ............... 210/21

FOREIGN PATENT DOCUMENTS
2820641  11/1978  Fed. Rep. of Germany ....... 423/139

*Primary Examiner*—Brian E. Hearn
*Attorney, Agent, or Firm*—Wegner & Bretschneider

[57] ABSTRACT

An acid solution containing cobalt and nickel is contacted with an organic extraction medium comprising alkyl phosphonic acid mono alkyl ester where said alkyl group has 8-10 carbon atoms in two or more stages, wherein the contact at a first stage is carried out at a pH value not exceeding 5.0 and at a second and further stages being carried out at a pH range of 5.5-7.0. Thereby cobalt may effectively and selectively be extracted into the organic extraction medium from the solution without excess rise in viscosity. Cobalt and nickel may be separately recovered with high purity.

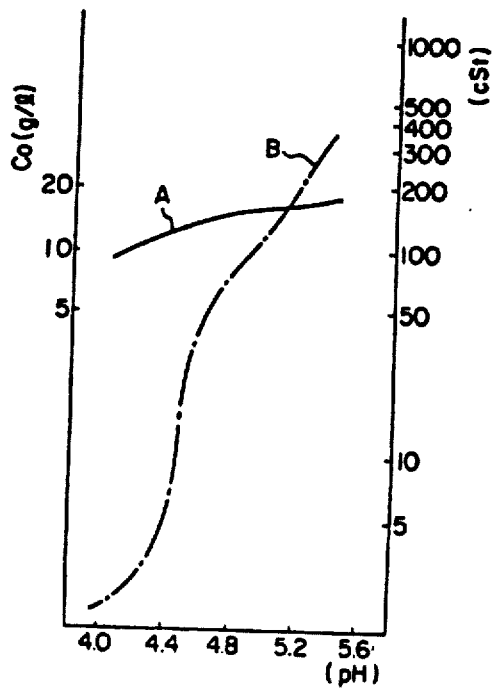

REEXAMINATION CERTIFICATE ISSUED UNDER 35 U.S.C. 307.

NO AMENDMENTS HAVE BEEN MADE TO THE PATENT

AS A RESULT OF REEXAMINATION, IT HAS BEEN DETERMINED THAT:

The patentability of claims 1-6 is confirmed.

* * * * *